United States Patent [19]
Bryden

[11] 3,783,915
[45] Jan. 8, 1974

[54] ROUTER OVERARM ATTACHMENT
[76] Inventor: Norman E. Bryden, 2407 Arden Dr., Champaign, Ill. 61820
[22] Filed: May 30, 1972
[21] Appl. No.: 258,045

[52] U.S. Cl............. 144/134 B, 145/129, 408/234, 408/239
[51] Int. Cl. ........................................... B27c 5/10
[58] Field of Search ...................... 144/134, 134 B; 408/238, 239, 240, 234; 145/129; 269/58, 59, 60, 71, 79, 80

[56] References Cited
UNITED STATES PATENTS

| | | |
|---|---|---|
| 2,896,677 | 7/1959 | Payzant........................... 408/234 X |
| 2,821,875 | 2/1958 | Buck............................... 408/234 X |
| 2,404,053 | 7/1946 | Glover, Jr. ...................... 408/238 X |
| 3,550,481 | 12/1970 | Jensen .............................. 408/239 |
| 3,242,773 | 3/1966 | Praag............................. 145/129 X |
| 1,696,032 | 12/1928 | Glover............................ 144/134 B |

Primary Examiner—Andrew R. Juhasz
Assistant Examiner—W. D. Bray
Attorney—Le Blanc & Shur

[57] ABSTRACT

A device which will contain an electric router in a detachable manner and provide for a controlled vertical movement of the router relative to a work surface. The device is detachably mounted to a round pipe column or spindle. Affixed in this manner, the tool is used for cutting wood, and other materials.

7 Claims, 1 Drawing Figure

PATENTED JAN 8 1974 3,783,915
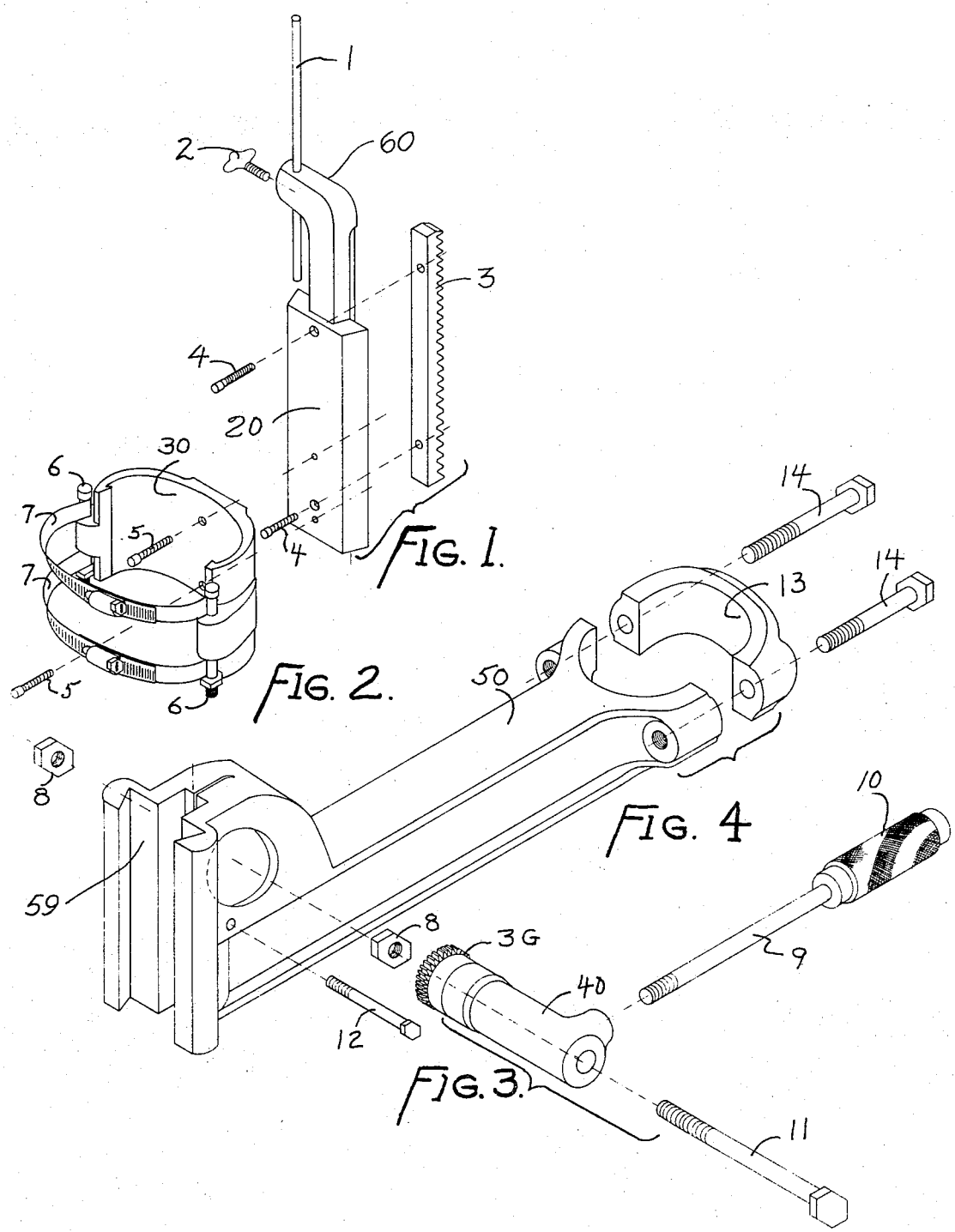

ROUTER OVERARM ATTACHMENT

The present invention relates to an attachment for conventional power tools and particularly relates to an attachment for releasably securing a router to the spindle of a conventional power tool, i.e., a drill press, with the router being movable toward and away from the work surface thereby to obtain various depths of cuts in the work.

In my invention an electric router of variable diameters is clamped into one end of an arm which forms a part of the attachment. The arm is secured at one end to a pipe column or spindle generally used in conventional power tools, for example, the column in a drill press. The attachment has great utility since the router carried thereby can be raised, lowered, rotated or removed, leaving the drill press column or spindle for other uses. When set up for work the attachment has a gear controled movement for depth selection of the router cutting bit, such movement being hand controlled by the operator. Also the router is readily removable from the attachment for other uses.

Accordingly, it is a primary object of the present invention to provide an attachment for a conventional power tool having a spindle wherein the attachment is releasably secured to the spindle and carries a router together with means for adjusting the elevation of the router above the work.

The sole FIGURE of the drawings is a perspective view of the parts of a router overarm attachment constructed in accordance with the present invention illustrating the parts thereof in exploded juxtaposition.

Referring to the drawing, slide 20 is an element whose function is to slide vertically, relative to arm 50 in a dovetail guideway 59 carried on one end of arm 50, element 20 being retained against lateral movement by its dovetail edges engaging in the dovetail groove. At the top of element 20, there is provided an inverted L-shaped member 60 which prevents slide 20 from sliding downwardly off of arm 50 when in use. A depth gauge rod 1 slides thru a vertical hole in the leg member 60 and is held at the selected position by a thumb screw 2 threaded into the end of member 60. Controlled vertical sliding movement is accomplished by a rack and pinion or gear arrangement including a spur gear 3G and a rack 3. For present purposes, it is sufficient to note that the vertically extending rack 3 which is bolted to the backside of slide 20 by bolts 4 and is receivable in a vertical slot 61 formed through guideway 29 on the end of arm 50.

A curved segment or generally C-shaped base 30 is secured to slide 20 by bolts 5, the base 30 being secured on the side of slide 20 remote from rack 3. A router motor, not shown, is releasably secured to base 30 by two adjustable metal straps 7. Straps 7 are secured to base 30 by two detachable bolts 6.

A hub or sleeve 40 is provided and carries gear 3G. A bolt 11 is secured to arm 50 by nuts 8, bolt 11 being thereby fixed to arms 50. Hub 40 is rotatable about bolt 11 and thus gear 3G, which meshes with rack 3, is rotatable in either direction to move element 20 and hence the router toward and away from the work surface located below arm 50. A handle 10 is used to rotate hub 40. The inner end of handle 40 is comprised of a rod or pin 9 which is threadedly engageable with hub 40 and engageable against bolt 11. Thus hub 40 can be locked in any desired position by threading rod 9 into engagement against the axle-bolt whereby the router carried by base 30 is locked in a selected elevational above the work surface.

Arm 50 is located in a horizontal plane on a vertically extending spindle or support column, not shown, by a split collar 13. Particularly, arm 50 is detachably secured to the spindle by bolting the collar 13 to arm 50 by bolts 14.

On the opposite end of arm 50, the dovetail or guideway 59 is fitted to slide 20 and allows slide 20 to slide vertically. The dovetail or guideway 59 is laterally adjustable to adjust the grip on the slide by a bolt 12 which threads into one side of the split end of arm 50.

When the unit is secured to the column spindle or by the split collar arrangement and holds a router in position above the work, the router can be lowered into the work piece in such a manner as to let the cutting bit enter the work piece to various depths. The rod 1 serves as a guide by which the depth of cut can be determined and regulated. That is, the abutment of the lower end of rod 1 against arm 50 and the thumbscrew securement of rod 1 to slid 20 permits the router bit to be selectively adjustable in elevation relative to the arm 50.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An overarm attachment for mounting a portable tool to a fixed support spindle and above a horizontally disposed work surface comprising a support arm, means carried at one end of said arm for releasably securing said arm to the spindle and supporting said arm in generally spaced parallel relation above the work surface, an element carried by said arm for releasably mounting the tool, means connecting said element and said arm one to the other at the opposite end of said arm and providing for movement of said element relative to said arm toward and away from the work surface, and means for locking said element to said arm to prevent movement of said element relative to said arm and to locate said element in a selected elevation above the work surface.

2. An attachment according to claim 1 wherein said connecting means includes a guideway carried by said arm and a slide carried by said element slidably receivable in the guideway carried by said arm.

3. An attachment according to claim 2 wherein said moving means comprises a rack carried by said slide and a pinion rotatably carried by said arm and in meshing engagement with said rack, and means for rotating said pinion thereby to move said element relative to said arm.

4. An arrangement according to claim 3 including an axle carried by said arm, a sleeve carrying said pinion and rotatably carried by said axle, said locking means including a pin threadedly engageable with said sleeve and engageable with said axle to lock said sleeve against rotation relative to said axle.

5. An attachment according to claim 1 including a depth gauge rod carried by said element and means carried by said element for releasably locking said rod in selected elevations above the work surface.

6. An attachment according to claim 1 wherein said element includes a generally C-shaped base disposed on its side and opening laterally in a direction away from said arm, and means carried by said base and extending across the lateral opening thereof for releasably clamping the tool to said base.

7. An attachment according to claim 4 including a depth gauge rod carried by said element and means carried by said element for releasably locking said rod in selected elevations above the work surface, said element including a generally C-shaped base disposed on its side and opening laterally in a direction away from said arm, and means carried by said base and extending across the lateral opening thereof for releasably clamping the tool to the base, said securing means including a split collar.

* * * * *

PO-1050
(5/69)

UNITED STATES PATENT OFFICE
CERTIFICATE OF CORRECTION

Patent No. 3,783,915                      Dated   January 8, 1974

Inventor(s)    Norman E. Bryden

It is certified that error appears in the above-identified patent and that said Letters Patent are hereby corrected as shown below:

Col. 1, line 9, "an" should read --any--; line 58, "arms" should read --arm--.

Col. 2, line 1-2, "elevational" should read --elevation--; line 13, "column spindle" should read --spindle or column--.

Signed and sealed this 21st day of May 1974.

(SEAL)
Attest:

EDWARD M. FLETCHER, JR.          C. MARSHALL DANN
Attesting Officer                Commissioner of Patents